F. O. JAQUES, Sr.
MICROMETER CALIPERS.
APPLICATION FILED AUG. 15, 1910.
990,655.
Patented Apr. 25, 1911.
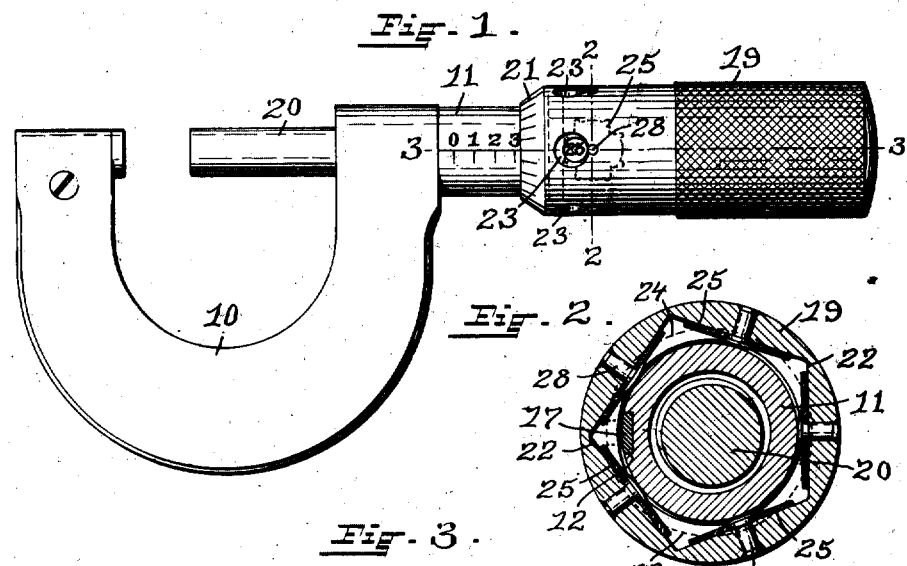
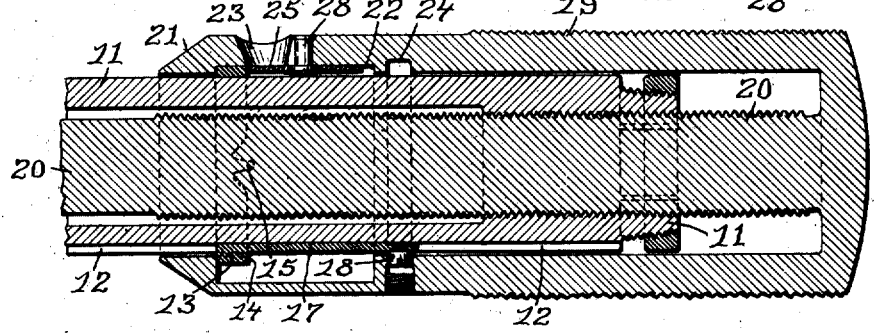
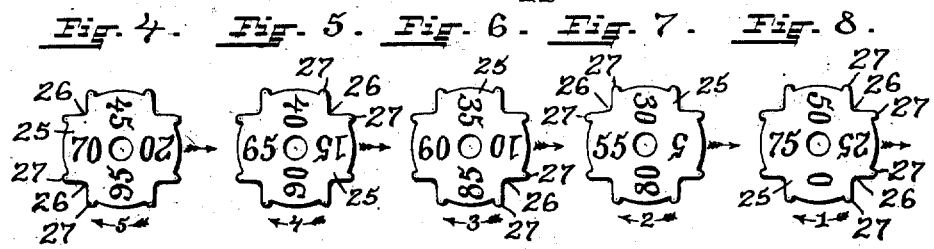
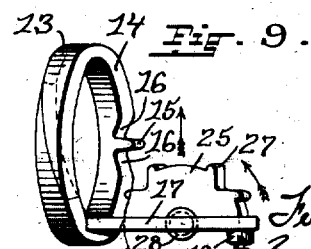
WITNESSES:
Julia Ricci
B. A. Gage
INVENTOR:
Fernando Oscar Jaques Sr.
by Charles H. Luther
ATTORNEY.

UNITED STATES PATENT OFFICE.

FERNANDO OSCAR JAQUES, SR., OF CRANSTON, RHODE ISLAND.

MICROMETER-CALIPERS.

990,655.   Specification of Letters Patent.   Patented Apr. 25, 1911.

Application filed August 15, 1910. Serial No. 577,271.

*To all whom it may concern:*

Be it known that I, FERNANDO OSCAR JAQUES, Sr., a citizen of the United States, residing at Cranston, in the county of Providence and State of Rhode Island, have invented a new and useful Improvement in Micrometer-Calipers, of which the following is a specification.

This invention has reference to an improvement in measuring instruments of precision and more particularly to an improvement in micrometer calipers.

In the usual construction of micrometer calipers for measuring decimal fractions of an inch, as heretofore constructed, the barrel is graduated by transverse lines, the longer of which are one-tenth of an inch apart and are marked by numerals. Three shorter lines divide the space between the long lines into four equal parts. A thimble secured to and turning with the screw-threaded spindle forms the handle of the caliper and its forward beveled end is graduated into twenty-five equal parts, each line of which represents a longitudinal movement of the spindle equal to one one-thousandth of an inch. In reading the micrometric fractions of these calipers errors are frequently made, because these calipers do not clearly indicate the measurement.

The object of my invention is to improve the construction of a micrometer caliper, whereby the accurate reading of the caliper is greatly facilitated.

A further object of my invention is to simplify the construction of any easy reading micrometer caliper, thereby improving the accurate reading of the caliper, simplifying and reducing the number of operating parts, which have a positive action and are protected from injury and misplacement and reducing the cost of manufacturing.

My invention consists in the peculiar and novel construction of an easy reading micrometer caliper having details of construction, as will be more fully set forth hereinafter and claimed.

Figure 1. is a face view of my improved micrometer caliper showing the same reading three hundred and twenty-five one-thousandths of an inch. Fig. 2. is an enlarged transverse section view taken on line 2. 2. of Fig. 1. showing the disks protected from injury. Fig. 3. is an enlarged longitudinal detail section view taken on line 3. 3. of Fig. 1. Figs. 4. 5. 6. 7. and 8. are enlarged face views of the indicating disks, showing their relative positions and the arrangement of the indicating numerals on the disks, and Fig. 9. is an enlarged perspective view showing the means for intermittently revolving the disks.

In the drawings, 10. indicates the U shape frame of the caliper having an outwardly extending internally screw-threaded barrel 11. which has an outer longitudinal slot 12. and is graduated on its surface by transverse lines into tenths of an inch, with an indicating numeral for each line, as shown in Fig. 1. A split ring 13, surrounds the barrel 11. on which it has a sliding fit and is constructed to have a flat edge 14. an outwardly projecting tooth 15. with indentures 16. 16. at each side of the tooth and an outwardly extending spline 17. which has a sliding fit in the slot 12. in the barrel 11. and a pin 18. on the spline, as shown in Fig. 9. A thimble 19. forms a part of or is secured to an externally screw-threaded spindle 20. which extends through and is in screw-threaded engagement with the barrel 11. as shown in Fig. 3. The thimble 19. surrounds the barrel 11. and is constructed to have a beveled end 21. which is graduated by long and short longitudinal lines into twenty-five equal parts, each graduation equaling one one-thousandth of an inch, a series of five flattened faces 22. 22. on the inner circumference of the thimble, an opening 23. extending from each flattened face 22. outward through the thimble and an internal annular groove 24. for the pin 18. on the spline 17. as shown in Fig. 3.

A series of preferably five indicating disks 25. 25. are each constructed to have four equally disposed V shape notches 26. 26. in their periphery, the edges of each notch extending outward into rounded projections 27. 27. and each disk is rotatably secured one for each flattened face 22. to the inside of the thimble 19. by studs 28. 28. at right angles to the axis of the thimble, as shown in Figs. 2. and 3. The indicating disks 25. 25. each have preferably four numerals on their outer faces between the notches and are positioned in the thimble 19. from left to right as shown in Figs. 8. 7. 6. 5. and 4. Number 1. disk is numbered 0. 25. 50. 75., number 2 disk 5. 30. 55. 80., number 3. disk 10. 35. 60. 85., number 4. disk 15. 40. 65. 90. and number 5. disk 20. 45. 70. 95. each number indicating thousandths of an inch by fifths. When assembled the pin 18. on the spline 17. enters the internal annular groove 24. in the thimble 19. The split ring 13. has a longitudinal movement with the thimble 19. but is held from rotation on the barrel 11. by the spline 17. in the slot 12. in the barrel 11. as shown in Figs. 2. and 3.

In the operation of my improved micrometer caliper the indicating disks 25. 25. revolve with the thimble 19. around the axis of the thimble but are prevented from revolving on their own axis by the rounded projections 27. 27. on the periphery of the disks engaging with the flat edge 14. of the ring 13. until the tooth 15. on the ring engages with a notch 26. in a disk and revolves the disk one quarter of a revolution. Starting with the reading of zero the indicating disks 25. 25. are positioned consecutively from left to right as shown in Figs. 4. to 8. around on the inside of the thimble 19. with the 0. showing through an opening 23. which is on a line with the numerals on the barrel 11., the reading always being taken through an opening in this position. One fifth of a revolution of the thimble 19. to the left, brings the tooth 15. on the ring 13. into a notch 26. in the indicating disk number 2. and rotates number 2. disk one quarter of a revolution in the direction of arrow 2. Fig. 7. and brings the numeral 5. on the disk under the opening 23. The reading would now be five one-thousandths of an inch. The next fifth turn of the thimble 19. would revolve the indicating disk number 3. one quarter of a revolution and bring into reading position the numeral 10. the next fifth would bring into reading position the numeral 15. on disk 4. the next fifth would bring into reading position the numeral 20. on disk 5. the last fifth of a revolution of the thimble 19. would revolve the indicating disk number 1. one quarter of a revolution and bring into reading position the numeral 25. on the disk. The reading would now be twenty-five one-thousandths of an inch. The next fifth turn of the thimble would rotate the disk number 2. one quarter of a revolution and bring into reading position under the opening 23. the numeral 30. and so on, each fifth turn given to the thimble 19. rotating an indicating disk 25. one quarter of a revolution and bringing into reading position through the opening 23. the correct numeral. After the thimble 19. has been revolved to the left thirteen complete turns, the reading would be three hundred and twenty-five one thousandths of an inch, as is clearly shown in Fig. 1. If the thimble 19. were now turned to the left one indicating line on the beveled end of the thimble, the reading would then be three hundred and twenty six one-thousandths of an inch. The operation is the same whether the thimble 19. is turned to the left or right, the numerals on the disks always showing the correct reading in either direction.

By the peculiar and novel construction of my improved micrometer caliper the correct reading of the caliper is seen at a glance, the shorter lines on the beveled end of the thimble being used only when the reading comes between fifths of one-thousandths of an inch, the usual confusing short indicating lines on the barrel dividing the tenths into fourths are dispensed with and the indicating disks, (which in other forms of micrometer calipers are exposed and are liable to injury or misplacement) are protected from injury or misplacement.

It is evident that the construction of my improved micrometer caliper could be varied within the scope of the appended claims, without materially affecting the spirit of my invention.

Having thus described my invention I claim as new and desire to secure by Letters Patent:—

1. A micrometer caliper comprising a barrel, a thimble rotatably surrounding the barrel, an indicating disk rotatably secured to the thimble; the axis of the disk being at right angles to the axis of the barrel and means for revolving the indicating disk whereby the disk is rotated on its axis upon revolution of the thimble.

2. A micrometer caliper comprising a barrel, a thimble rotatably surrounding the barrel, an indicating disk rotatably secured to the thimble intermediate the barrel and the thimble and means for intermittently revolving the indicating disk whereby the disk is rotated on its axis upon revolution of the thimble.

3. A micrometer caliper comprising a barrel, a thimble rotatably surrounding the barrel, a series of indicating disks rotatably secured to the thimble intermediate the barrel and the thimble, the axis of the indicating disks being at right angles to the axis of the thimble and means for giving an intermittent rotary motion to the indicating disks whereby the disks are rotated on their axes upon revolution of the thimble.

4. A micrometer caliper comprising a barrel, a thimble rotatably surrounding the barrel and having a series of openings, a series of indicating disks rotatably secured to the thimble intermediate the barrel and the thimble, under the openings in the thimble, the axis of the indicating disks being at right angles to the axis of the thimble and means for intermittently revolving the indicating disks.

5. In a micrometer caliper, a frame, a barrel on the frame, a thimble rotatably surrounding the barrel, and having a series of openings, a series of indicating disks rotatably secured to the thimble under the openings in the thimble and intermediate the barrel and the thimble, the axis of the indicating disks being at right angles to the axis of the thimble, an operating member rotatably attached to the thimble and slidably secured to the barrel, and means on the operating member coacting with means on the indicating disks and with the thimble to intermittently revolve the indicating disks.

6. In a micrometer caliper, a frame, a barrel on the frame, a spindle extending through the barrel, a thimble on the spindle rotatably surrounding the barrel, and having a series of radial openings, a series of indicating disks rotatably secured to the thimble under the radial openings and intermediate the barrel and the thimble, the axis of the indicating disks being at right angles to the axis of the spindle, an operating member slidably secured to the barrel and rotatably attached to the thimble, and means on the operating member coacting with means on the indicating disks and with the thimble to intermittently revolve the indicating disks.

7. In a micrometer caliper, a frame, an internally screw-threaded barrel on the frame, a spindle extending through and in screw-threaded engagement with the barrel, a thimble on the spindle rotatably surrounding the barrel and having a series of openings, a series of indicating disks rotatably secured to the thimble under the openings, the axis of the indicating disks being at right angles to the axis of the spindle and the indicating disks having on their faces numerals or their equivalents, an operating member slidably secured to the barrel and rotatably attached to the thimble, and means on the operating member coacting with means on the indicating disks to intermittently revolve the indicating disks and with the thimble.

8. In a micrometer caliper, a frame, an internally screw-threaded barrel on the frame, said barrel having numerals or their equivalents, a screw-threaded spindle extending through the barrel, a thimble on the spindle rotatably surrounding the barrel and having a series of openings and a series of indicating lines or their equivalents, a series of indicating disks rotatably secured to the thimble under the openings, the axis of the indicating disks being at right angles to the axis of the spindle, and the indicating disks having on their faces numerals or their equivalents, a disk operating member slidably secured to the barrel and rotatably attached to the thimble and means on the disk operating member coacting with means on the indicating disks and with the thimble to intermittently revolve the indicating disks.

9. A micrometer caliper comprising a U shape frame, an internally screw-threaded barrel on the frame having a longitudinal slot and numerals or their equivalents on the barrel, a screw-threaded spindle extending through the barrel, a thimble on the spindle rotatably surrounding the barrel, and having a series of flat inner faces, a series of openings and a series of indicating lines or their equivalents, a series of indicating disks rotatably secured to the thimble on the flat faces under the openings, the axis of the indicating disks being at right angles to the axis of the spindle and the indicating disks having notches in their periphery and numerals or their equivalents on their faces, a ring surrounding the barrel and having a tooth adapted to engage with the notches in the indicating disks to intermittently revolve the disks, a spline in the slot in the barrel and a pin on the spline engaging with an internal annular groove in the thimble to rotatably attach the ring to the thimble.

In testimony whereof, I have signed my name to this specification in the presence of two subscribing witnesses.

FERNANDO OSCAR JAQUES, SR.

Witnesses:
LEON E. DANFORTH,
CHAS. H. LUTHER.

---

Copies of this patent may be obtained for five cents each, by addressing the "Commissioner of Patents, Washington, D. C."